(12) United States Patent
Wada (10) Patent No.: US 11,320,525 B2
(45) Date of Patent: May 3, 2022

(54) RADAR APPARATUS AND METHOD FOR AVOIDING RADIO INTERFERENCE

(71) Applicants: KABUSHIKI KAISHA TOSHIBA, Minato-ku (JP); Toshiba Infrastructure Systems & Solutions Corporation, Kawasaki (JP)

(72) Inventor: Masakazu Wada, Yokohama (JP)

(73) Assignees: KABUSHIKI KAISHA TOSHIBA, Minato-ku (JP); Toshiba Infrastructure Systems & Solutions Corporation, Kawasaki (JP)

(*) Notice: Subject to any disclaimer, the term of this patent is extended or adjusted under 35 U.S.C. 154(b) by 323 days.

(21) Appl. No.: 16/271,097

(22) Filed: Feb. 8, 2019

(65) Prior Publication Data

US 2019/0212427 A1 Jul. 11, 2019

Related U.S. Application Data

(63) Continuation of application No. PCT/JP2017/039133, filed on Oct. 30, 2017.

(30) Foreign Application Priority Data

Jan. 26, 2017 (JP) .............................. JP2017-012087

(51) Int. Cl.
*G01S 13/22* (2006.01)
*G01S 13/95* (2006.01)
(Continued)

(52) U.S. Cl.
CPC .............. *G01S 13/22* (2013.01); *G01S 7/023* (2013.01); *G01S 7/36* (2013.01); *G01S 13/24* (2013.01); *G01S 13/95* (2013.01); *Y02A 90/10* (2018.01)

(58) Field of Classification Search
CPC .......... G01S 13/22; G01S 13/24; G01S 13/95; G01S 7/23; G01S 7/36
(Continued)

(56) References Cited

U.S. PATENT DOCUMENTS 6,397,149 B1 5/2002 Hashimoto
7,623,060 B1 11/2009 Chhabra et al.
(Continued)

FOREIGN PATENT DOCUMENTS

JP 54-32091 3/1979
JP 2001-285301 10/2001
(Continued)

OTHER PUBLICATIONS

International Search Report dated Jan. 23, 2018 in PCT/JP2017/039133 filed Oct. 30, 2017 (with English Translation).
(Continued)

*Primary Examiner* — Bo Fan
(74) *Attorney, Agent, or Firm* — Oblon, McClelland, Maier & Neustadt, L.L.P.

(57) ABSTRACT

According to one embodiment, a radar apparatus includes a signal processing device that has a first circuit, a second circuit and a transmitter. The first circuit is configured to determine whether or not there is a radio interference based on a radio signal received via an antenna. The second circuit is configured to, when the first circuit determines that there is the radio interference, select a predetermined pulse pattern based on an avoiding function of a wireless communication device having the avoiding function of the radio interference, the predetermined pulse pattern being separately defined from a pulse pattern of transmission processing for operating a radar. The transmitter is configured to transmit from the antenna a radio signal matching the pulse pattern selected by the second circuit.

14 Claims, 4 Drawing Sheets

(51) Int. Cl.
*G01S 7/36* (2006.01)
*G01S 13/24* (2006.01)
*G01S 7/02* (2006.01)

(58) Field of Classification Search
USPC .................................................. 342/137, 202
See application file for complete search history.

(56) References Cited

U.S. PATENT DOCUMENTS

| | | | |
|---|---|---|---|
| 2007/0126622 A1 | 6/2007 | Nallapureddy et al. | |
| 2009/0146866 A1 | 6/2009 | Matsumoto et al. | |
| 2011/0063164 A1 | 3/2011 | Mizutani et al. | |
| 2012/0213086 A1 | 8/2012 | Matsuura | |
| 2013/0342388 A1* | 12/2013 | Maeno | G01S 7/2813 342/202 |
| 2015/0378005 A1 | 12/2015 | Kojima | |
| 2016/0285611 A1 | 9/2016 | Fischer et al. | |
| 2018/0095161 A1* | 4/2018 | Kellum | H01Q 3/267 |

FOREIGN PATENT DOCUMENTS

| | | |
|---|---|---|
| JP | 2002-139565 | 5/2002 |
| JP | 2007-171164 | 7/2007 |
| JP | 2007-274659 | 10/2007 |
| JP | 2009-141901 | 6/2009 |
| JP | 2011-59016 | 3/2011 |
| JP | 2012-120033 | 6/2012 |
| JP | 2014-25914 | 2/2014 |
| JP | 2016-173286 | 9/2016 |

OTHER PUBLICATIONS

Written Opinion dated Jan. 23, 2018 in PCT/JP2017/039133 filed Oct. 30, 2017.
Extended European Search Report dated Sep. 1, 2020 in European Patent Application No. 17894640.6, 9 pages.

* cited by examiner

F I G. 1

170

| TYPE | PULSE WIDTH | PULSE REPETITION FREQUENCY | NUMBER OF PULSES | FREQUENCY SWEEP WIDTH |
|---|---|---|---|---|
| T1 | PW1 | PRF1 | PN1 | FW1 |
| T2 | PW2 | PRF2 | PN2 | FW2 |
| ⋮ | ⋮ | ⋮ | ⋮ | ⋮ |

F I G. 2

171

| ELEVATION ANGLE | AZIMUTH ANGLE | INTERFERENCE | VALID |
|---|---|---|---|
| 0 | 0 | YES | T1 |
|  | 1 | NO | T2 |
|  | ⋮ | ⋮ | ⋮ |
|  | 360 | NO | ⋮ |
| ⋮ | ⋮ | ⋮ | ⋮ |

RADAR APPARATUS AND METHOD FOR AVOIDING RADIO INTERFERENCE

CROSS-REFERENCE TO RELATED APPLICATIONS

This application is a Continuation application of PCT Application No. PCT/JP2017/039133, filed Oct. 30, 2017 and based upon and claiming the benefit of priority from prior Japanese Patent Application No. 2017-012087, filed Jan. 26, 2017, the entire contents of all of which are incorporated herein by reference.

FIELD

An embodiment of the present invention relates to a radar apparatus and a method for avoiding a radio interference.

BACKGROUND

In recent years, a wireless communication device such as a wireless LAN promotes a higher frequency of a use frequency for a purpose of large volume communication. Hence, use frequency bands of the wireless communication device and a radar apparatus such as a weather radar overlap, and therefore a radio interference is highly likely to occur.

Conventionally, in a case of, for example, the wireless LAN which uses a frequency band of 5 GHz, this frequency band is used by the radar apparatus such as the weather radar is used, and therefore the radio interference is likely to occur. As a countermeasure for avoiding this radio interference, an access point of the wireless LAN includes a mounted radio interference avoiding function which is generally called DFS (Dynamic Frequency Selection).

As a measure for avoiding a radio interference, for example, a DFS function is mounted on an access point of a wireless LAN. This DFS function determines whether or not a signal received by the access point includes a pulse pattern of a radar apparatus defined in advance. The pulse pattern is defined based on parameters such as a pulse width, a pulse repetition frequency (pulse repetition interval) and the number of pulses. When determining (detecting) that the pulse pattern is included, the DFS function avoids an interference with a transmission pulse signal of the radar apparatus by changing a channel to a channel of another frequency. In this regard, when detecting the pulse pattern of the radar apparatus, the DFS function interrupts use of the channel of this frequency only for a certain time (e.g., 30 minutes). After the certain time passes, this channel is used again and a radio interference is likely to occur. Furthermore, the DFS function of the access point of the wireless LAN is not validated due to some cause, and is likely to cause the radio interference eventually.

It is therefore a task to realize a radar apparatus which can avoid a radio interference with a wireless communication device which has a radio interference avoiding function.

DETAILED DESCRIPTION

According to one embodiment, a radar apparatus includes a signal processing device that has a first circuit, a second circuit and a transmitter. The first circuit is configured to determine whether or not there is a radio interference based on a radio signal received via an antenna. The second circuit is configured to, when the first circuit determines that there is the radio interference, select a predetermined pulse pattern based on an avoiding function of a wireless communication device having the avoiding function of the radio interference, the predetermined pulse pattern being separately defined from a pulse pattern of transmission processing for operating a radar. The transmitter is configured to transmit from the antenna a radio signal matching the pulse pattern selected by the second circuit.

The embodiment will be described below with reference to the drawings.

First Embodiment

Figure 1:
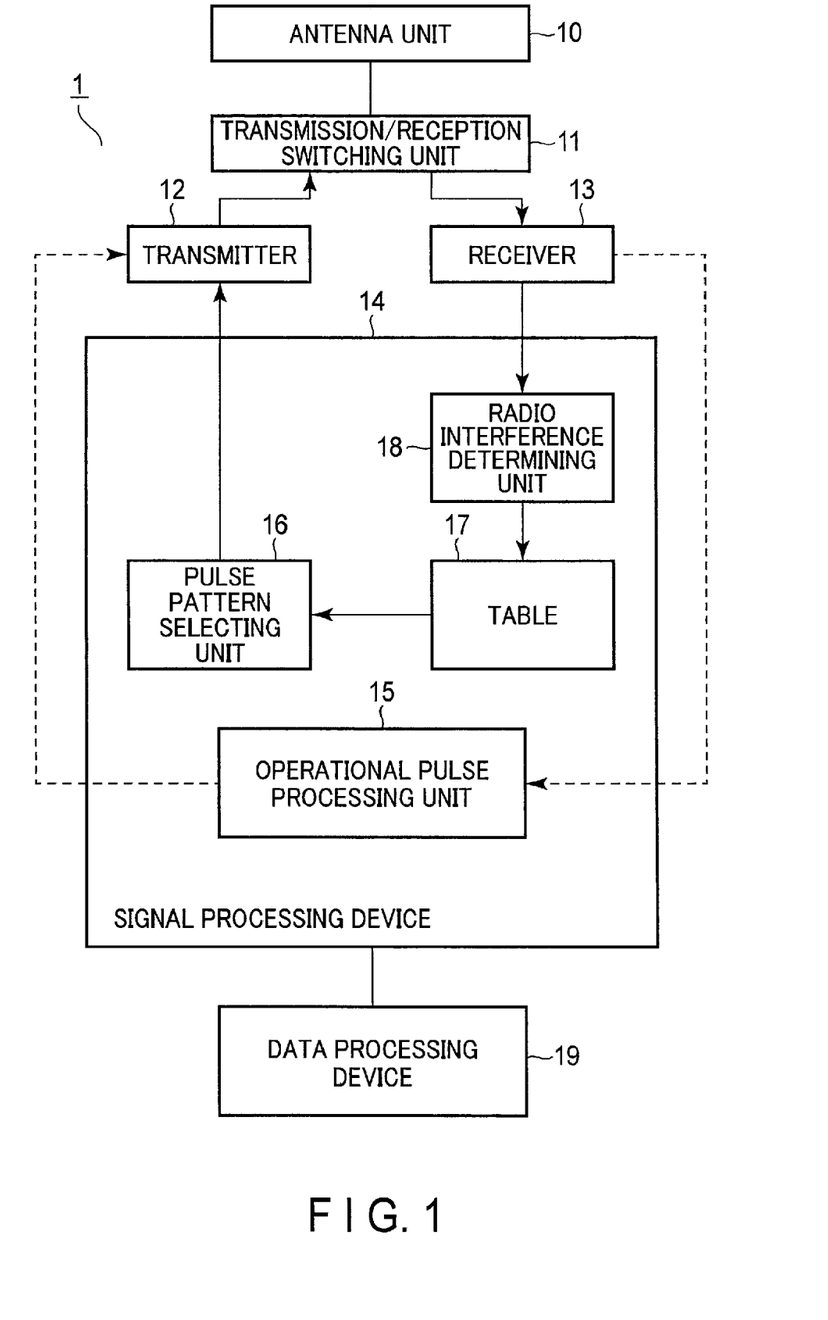
FIG. 1 is a block diagram for explaining a configuration of a radar apparatus according to an embodiment.

FIG. 1 is a block diagram illustrating a configuration of a radar apparatus according to the present embodiment. As illustrated in FIG. 1, a radar apparatus 1 includes an antenna unit 10, a transmission/determination switching unit 11, a transmitter 12, a receiver 13, a signal processing device 14 and a data processing device 19. The antenna unit 10 is, for example, a parabolic antenna device or an array antenna device formed by a plurality of antenna elements. The transmission/determination switching unit 11 switches transmission/determination processing of a radar signal, and transfers a transmission pulse from the transmitter 12 to the antenna unit 10 or transfers a radio signal received from the antenna unit 10 to the receiver 13.

The transmitter 12 generates the transmission pulse (radar signal) matching a pulse pattern outputted from the signal processing device 14, and outputs the transmission pulse to the antenna unit 10. The signal processing device 14 according to the present embodiment outputs a pulse pattern (referred to as an operational pulse pattern for ease of description in some cases) which is necessary for a normal operation (detection, observation and measurement) for a normal radar operation to the transmitter 12. In addition, the signal processing device 14 outputs a pulse pattern related to a radio interference avoiding function according to the present embodiment to the transmitter 12, as described below.

The receiver 13 digitally processes the radio signal received by the antenna unit 10, and outputs the processed received signal to the signal processing device 14. The received signal includes not only an echo signal of the transmitted radar signal, but also a radio signal transmitted from a wireless communication device such as a wireless LAN as described below.

The signal processing device 14 includes an operational pulse processing unit 15 which outputs the operational pulse pattern to the transmitter 12 during transmission, and processes the received signal outputted from the receiver 13 during determination. That is, the operational pulse processing unit 15 processes transmission/received signals which are necessary for the normal operation (detection, observation and measurement) for a normal radar operation. In the present embodiment, the data processing device 19 executes data processing which is necessary for the normal operation (detection, observation and measurement) for the radar operation based on transmission/determination processing of the operational pulse processing unit 15. In addition, the present embodiment omits description of a configuration and an operation of the operational pulse processing unit 15, and the transmission/determination processing related to the normal operation (detection, observation and measurement) for the radar operation. Furthermore, to distinguish from the transmission/determination processing related to the normal operation for operating the radar, transmission/determination processing will be expressed as the transmission/determination processing on the radio interference avoiding function in some cases.

The signal processing device 14 according to the present embodiment includes a pulse pattern selecting unit 16, a table 17 and a radio interference determining unit 18 as components for realizing the radio interference avoiding function. The pulse pattern selecting unit 16 outputs the pulse pattern selected from a plurality of pulse patterns defined in advance to the transmitter 12. These pulse patterns are defined separately from the operational pulse pattern used for the normal operation (detection, observation and measurement) for the radar operation. A plurality of pulse patterns is selected from a pulse pattern table 170 included in the table 17. The table 17 includes the pulse pattern table 170 and a radio interference countermeasure table 171.

Figure 2:
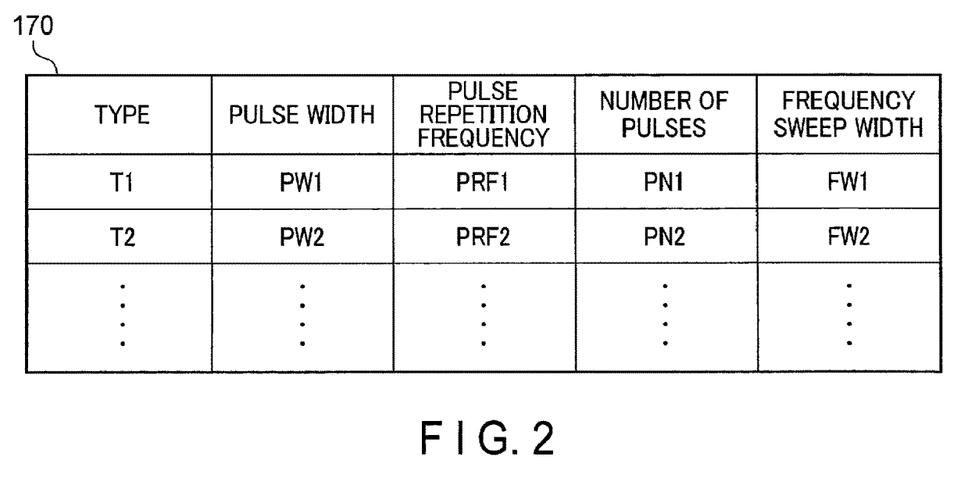
FIG. 2 is a view illustrating one example of a pulse pattern table according to the embodiment.

FIG. 2 is a view illustrating one example of the pulse pattern table 170. As illustrated in FIG. 2, the pulse pattern table 170 includes, for example, pulse patterns of a plurality of types (which is two types of T1 and T2 for ease of description) defined for the weather radar based on, for example, a law and standards of a country. The types T1 and T2 are respectively pulse patterns defined by parameters such as pulse widths (PW1 and PW2), pulse repetition frequencies (PRF1 and PRF2), the numbers of pulses (PN1 and PN2) and frequency sweep widths (FW1 and FW2). In addition, the pulse pattern table 170 can be updated by adding new types of pulse patterns by an online or offline method or changing existing pulse patterns according to, for example, a change in the law or the standards of the country.

Figure 3:
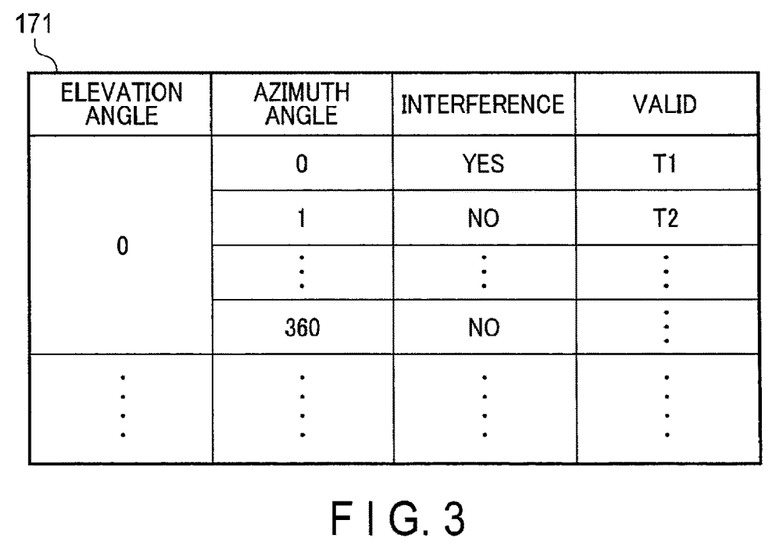
FIG. 3 is a view illustrating one example of a radio interference countermeasure table according to the embodiment.

FIG. 3 is a view illustrating one example of the radio interference countermeasure table 171. As illustrated in FIG. 3, the countermeasure table 171 is a table which records the types T1 and T2 indicating whether or not there is a radio interference, and valid pulse patterns per elevation angle and azimuth angle of an antenna during determination processing on the radio interference avoiding function as described below.

Back to FIG. 1, the radio interference determining unit 18 determines whether or not there is a radio interference with the wireless communication device as described below during determination of the transmission/determination processing on the radio interference avoiding function. The present embodiment assumes, for example, the access point of the wireless LAN including a DFS function as the wireless communication device. The radio interference determining unit 18 determines that there is the radio interference with the wireless communication device which transmitted the radio signal, when a fluctuation in a distance direction (time direction) of a receiving level of the radio signal received by the antenna is within a predetermined range (the fluctuation is a fixed fluctuation which is impossible in a natural phenomenon) based on the radio signal received by the antenna during reception processing on the radio interference avoiding function. Alternatively, the radio interference determining unit 18 determines that there is the radio interference with the wireless communication device which transmitted the radio signal, when the fluctuation of the receiving level at the same distance of a plurality of transmission pulses exceeds the predetermined range (the fluctuation shows a binary change which is impossible in the natural phenomenon).

[Operation of Radar Apparatus]

Figure 4:
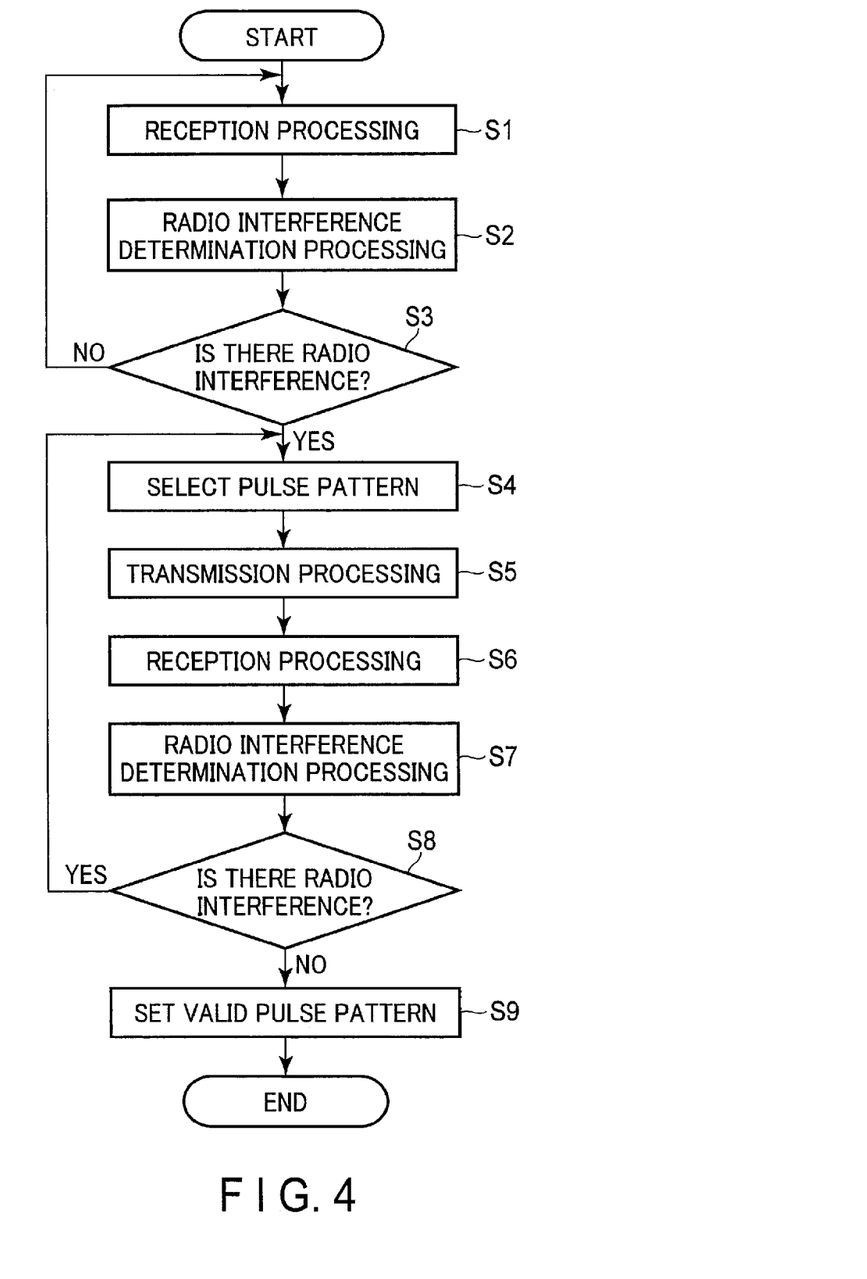
FIG. 4 is a flowchart for explaining an operation of the radar apparatus according to the embodiment.

FIG. 4 is a flowchart for explaining the operation of the radar apparatus 1. In this regard, as described above, the present embodiment omits description of the normal operation (detection, observation and measurement) of the operational pulse processing unit 15 for the radar operation. In the present embodiment, the signal processing device 14 executes transmission/determination processing on the radio interference avoiding function separately from the transmission/determination processing during the normal operation for the radar operation.

As illustrated in FIG. 4, the signal processing device 14 executes determination processing on the radio interference avoiding function (step S1). The receiver 13 in the radar apparatus 1 outputs to the signal processing device 14 the received signal obtained by digitally processing the radio signal received by the antenna unit 10. The received signal includes a radio signal, too, transmitted from the wireless communication device such as the wireless LAN.

The radio interference determining unit 18 in the signal processing device 14 executes determination processing of determining whether or not there is a radio interference with the wireless communication device such as the wireless LAN during the determination processing on the radio interference avoiding function (step S2). The determination processing can be performed by focusing on a difference between a meteorological echo and a wireless communication signal. According to a specific determining method, when the fluctuation in the distance direction (time direction) of the receiving level of the radio signal received by the antenna is within the predetermined range (the fluctuation is a fixed fluctuation which is impossible in a natural phenomenon) per elevation angle and azimuth angle of the antenna during determination, the radio interference determining unit 18 determines that there is the radio interference. Alternatively, there may be means for determining that there is the interference when the fluctuation of the receiving level at the same distance of a plurality of transmission pulses exceeds the predetermined range (the fluctuation shows a binary change which is impossible in the natural phenomenon).

As illustrated in FIG. 3, the radio interference determining unit 18 sets whether or not there is the radio interference per elevation angle and azimuth angle to the radio interference countermeasure table 171 based on a radio interference decision result. In this regard, when the radio interference determining unit 18 determines and sets that there is the radio interference to the countermeasure table 171, the signal processing device 14 transitions to transmission processing on the radio interference avoiding function (YES in step S3). In this regard, after the radio interference determining unit 18 may determine whether or not there is the radio interference for all azimuth angles per elevation angle of the antenna, the signal processing device 14 may transition to transmission processing. Alternatively, immediately after the radio interference determining unit 18 determines whether or not there is the radio interference per azimuth angle, the signal processing device 14 may transition to the transmission processing.

According to the transmission processing on the radio interference avoiding function, the pulse pattern selecting unit 16 selects, for example, the pulse pattern of the type T1 from the pulse pattern table 170 (step S4). In this case, the pulse pattern selecting unit 16 may select pulse patterns in order from the pulse pattern table 170 or may select a pulse pattern in order from, for example, pulse patterns of a type similar to the parameters of the operational pulse pattern.

The pulse pattern selecting unit 16 selects, for example, the pulse pattern of the type T1, and outputs the pulse pattern to the transmitter 12. The transmitter 12 in the radar apparatus 1 generates a transmission pulse matching the pulse pattern of the type T1, and outputs the transmission pulse to the antenna unit 10. Thus, the radar apparatus 1 executes transmission processing of transmitting a radio signal matching the transmission pulse from the antenna unit 10 (step S5).

After this transmission processing, the signal processing device 14 executes determination processing on the radio interference avoiding function (step S6). The radio interference determining unit 18 executes decision processing of determining whether or not there is a radio interference similar to the above (step S7). When determining that there is no radio interference, the radio interference determining unit 18 sets information (T1 in this case) indicating that the transmitted pulse pattern of the type T1 is a valid pulse pattern to an item "valid" of the countermeasure table 171 as illustrated in FIG. 3 (NO in step S8, S9). That is, as illustrated in FIG. 3, information indicating the valid pulse pattern is set per elevation angle and azimuth angle of the antenna during determination to the countermeasure table 171.

In this regard, the valid pulse pattern is a pulse pattern which is detected by the DFS function of the access point of the wireless LAN which is the wireless communication device and is a target of radio interference avoiding processing of the DFS function. In other words, the access point of the wireless LAN detects a radio signal matching the pulse pattern of the type T1 by the DFS function, stops transmission of the radio signal which was determined to cause the radio interference, and changes the frequency of the radio signal by switching a channel.

That is, by detecting the valid pulse pattern, the access point of the wireless LAN can eventually recognize the presence of the radar apparatus 1 and avoid the radio interference. When it was determined that there is the radio interference, the signal processing device 14 according to the present embodiment executes the transmission processing on the radio interference avoiding function matching the valid pulse pattern (type T1 in this case) set to the countermeasure table 171. Thus, the access point of the wireless LAN is more highly likely to be able to reliably execute radio interference avoid processing by the DFS function, and reliably avoid the radio interference.

In addition, naturally, when the radio, interference determining unit 18 determines the radio interference as "Yes" (YES in step S8), the signal processing device 14 repeats processing from step S4. That is, the pulse pattern selecting unit 16 selects, for example, the pulse pattern of the type T2 from the pulse pattern table 170, and outputs the pulse pattern to the transmitter 12. Similarly, when determining that there is no radio interference, the radio interference determining unit 18 sets information (T2 in this case) indicating that the transmitted pulse pattern of the type T2 is a valid pulse pattern to the item "valid" of the countermeasure table 171 (NO in step S8, S9).

As described above, according to the present embodiment, the radio interference determining unit 18 determines whether or not there is a radio interference during the determination processing on the radio interference avoiding function. When this decision result shows that there is the radio interference, the transmission processing on the radio interference avoiding function of transmitting a pulse pattern defined in advance is executed. Consequently, when, for example, the access point of the wireless LAN having the DFS function can detect the pulse pattern by the DFS function, the access point can eventually recognize the presence of the radar apparatus 1 and avoid the radio interference.

Furthermore, when the radio interference avoiding function determines the pulse pattern transmitted during the transmission processing on the radio interference avoiding function as valid, the pulse pattern can be set as the valid pulse pattern. Consequently, the radar apparatus 1 according to the present embodiment can eventually reliably realize the radio interference avoiding function by transmitting this valid pulse pattern. In this case, the radar apparatus 1 can effectively exhibit the radio interference avoiding function by transmitting the valid pulse pattern per elevation angle and azimuth angle on a regular basis as illustrated in FIG. 3.

[Modification]

Figure 5:
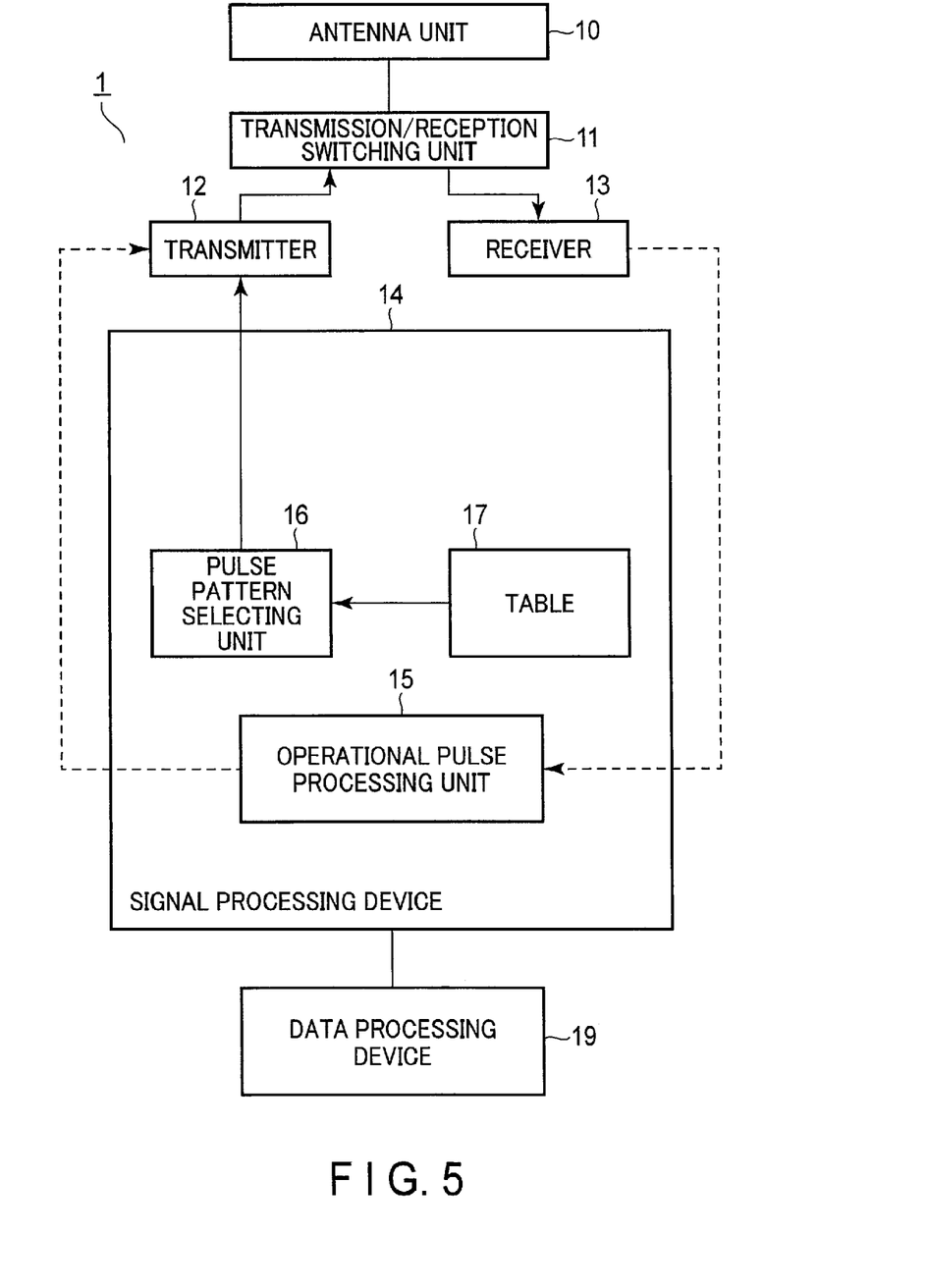
FIG. 5 is a block diagram for explaining a modification of the embodiment.

FIG. 5 is a block diagram illustrating a configuration of the radar apparatus 1 according to the modification of the present embodiment. As illustrated in FIG. 5, the signal processing device 14 in the radar apparatus 1 according to this modification employs a configuration which includes the pulse pattern selecting unit 16 and the table 17 as components for realizing the radio interference avoiding function and which omits the radio interference determining unit 18 according to the present embodiment. In addition, the other components are the same as the components of the radar apparatus 1 according to the present embodiment illustrated in FIG. 1, and therefore description thereof will be omitted.

An operation of the radar apparatus 1 according to this modification will be described below. In addition, in this modification, the pulse pattern table 170 included in the table 17 may be used, and the countermeasure table 171 may be omitted. Furthermore, similar to the present embodiment, this modification omits description of the configuration and the operation of the operational pulse processing unit 15, and the transmission/determination processing related to the normal operation (detection, observation and measurement) for the radar operation.

By executing transmission processing on the radio interference avoiding function, the radar apparatus 1 according to this modification can eventually increase a probability that it is possible to avoid a radio interference with the wireless communication device such as the access point of the wireless LAN. More specifically, according to the transmission processing on the radio interference avoiding function, the pulse pattern selecting unit 16 selects, for example, the pulse pattern of the type T1 from the pulse pattern table 170, and outputs the pulse pattern to the transmitter 12. The transmitter 12 generates a transmission pulse matching the pulse pattern of the type T1, and outputs the transmission pulse to the antenna unit 10. That is, the radar apparatus 1 executes transmission processing of transmitting a radio signal matching the transmission pulse from the antenna unit 10.

In this regard, the access point of the wireless LAN which is the wireless communication device and has the DFS function can receive a radio signal from the radar apparatus 1 by the DFS function, and detect the pulse pattern of the type T1. When detecting the pulse pattern of the type T1, the access point of the wireless LAN recognizes the presence of the radar apparatus 1 and executes processing of avoiding the radio interference.

In addition, when selecting a pulse pattern from the pulse pattern table 170 during the transmission processing on the radio interference avoiding function, the pulse pattern selecting unit 16 in the radar apparatus 1 according to the present embodiment may alternately select, for example, each pulse pattern of the types T1 and T2 per predetermined period.

As described above, according to this modification, by executing the transmission processing on the radio interference avoiding function, for example, the access point of the wireless LAN having the DFS function can detect the pulse pattern by the DFS function, and execute processing of avoiding the radio interference. Consequently, the access point having the DFS function recognizes the presence of the radar apparatus 1 according to the present embodiment, and eventually increases a probability that the radio interference avoiding function is effectively executed.

In addition, the present embodiment and the modification have described, for example, the access point of the wireless LAN as the wireless communication device, yet are not limited to this and are applicable to various wireless communication devices, too, which are likely to cause a radio interference with the radar apparatus. Furthermore, the present embodiment and the modification have described the DFS function as the radio interference avoiding function, yet are not limited to this. Another system may be employed as long as this system has a function of detecting a radio signal of the radar apparatus and stopping use of this frequency.

Some embodiments of the present invention have been described. However, these embodiments have been presented as exemplary embodiments, and do not intend to limit the scope of the invention. These new embodiments can be carried out as other various embodiments, and can be variously omitted, replaced and changed without departing from the gist of the invention. These embodiment and modification are included in the claims and the gist, and are included within a range equivalent to the invention recited in the claims likewise.

The invention claimed is:

1. A radar apparatus comprising:
a pulse pattern table storing a plurality of pulse patterns of different types and separately defined from a pulse pattern of transmission processing for operating a radar, and a radio interference countermeasure table indicating validity of the types of the plurality of pulse patterns for radio interference;
a first circuit configured to determine whether or not there is a radio interference based on a radio signal received via an antenna;
a second circuit configured to determine that there is the radio interference, and select a predetermined pulse pattern from the plurality of pulse patterns stored in the pulse pattern table and the radio interference countermeasure table based on an avoiding function of a wireless communication device having the avoiding function of the radio interference; and
a transmitter configured to transmit from the antenna a radio signal matching the pulse pattern selected by the second circuit.

2. The radar apparatus according to claim 1, further comprising a third circuit configured to, when the first circuit determines that there is not the radio interference after the radio signal matching the pulse pattern transmitted by the transmitter is transmitted, set the pulse pattern as a valid pulse pattern on the avoiding function of the radio interference.

3. The radar apparatus according to claim 2, wherein the transmitter transmits the radio signal matching the valid pulse pattern on a regular basis.

4. The radar apparatus according to claim 1, wherein the first circuit determines whether or not there is the radio interference per elevation angle and azimuth angle of the antenna during the determination.

5. The radar apparatus according to claim 4, wherein the transmitter transmits the radio signal from the antenna at the elevation angle and the azimuth angle at which the first circuit has determined that there is the radio interference, the radio signal matching the pulse pattern selected by the second circuit.

6. The radar apparatus according to claim 1, wherein the second circuit changes the predetermined pulse pattern until the first circuit determines that there is not the radio interference, and outputs the predetermined pulse pattern to the transmitter.

7. The radar apparatus according to claim 1, further comprising a fourth circuit configured to update the predetermined pulse pattern.

8. The radar apparatus according to claim 2, wherein
the first circuit determines whether or not there is the radio interference per elevation angle and azimuth angle of the antenna during the determination, and
the third circuit sets the valid pulse pattern per elevation angle and azimuth angle of the antenna.

9. The radar apparatus according to claim 8, wherein the transmitter transmits the radio signal matching the valid pulse pattern per elevation angle and azimuth angle of the antenna on a regular basis.

10. The radar apparatus according to claim 1, wherein the first circuit detects a determination level of the radio signal received via the antenna during determination processing on the avoiding function of the radio interference, and determines whether or not there is the radio interference based on a fluctuation range in a distance direction or a time direction of the determination level.

11. A radar apparatus comprising:
a pulse pattern table storing a plurality of pulse patterns of different types and separately defined from a pulse pattern of transmission processing for operating a radar, and a radio interference countermeasure table indicating validity of the types of the plurality of pulse patterns for radio interference;
a selecting circuit configured to, during transmission processing on an avoiding function of a radio interference, select a predetermined pulse pattern from the plurality of pulse patterns stored in the pulse pattern table and the radio interference countermeasure table; and
a transmitter configured to transmit from an antenna a radio signal matching the pulse pattern selected by the selecting circuit.

12. The radar apparatus according to claim 11, wherein
during the transmission processing on the avoiding function of the radio interference, the selecting circuit sequentially or arbitrarily selects a pulse pattern from the plurality of pulse patterns stored in the pulse pattern table, and
the transmitter transmits from the antenna the radio signal matching the pulse pattern selected by the selecting circuit.

13. A method for avoiding a radio interference applied to a radar apparatus, the method comprising:
- storing, in a pulse pattern table, a plurality of pulse patterns of different types and separately defined from a pulse pattern of transmission processing for operating a radar, and storing, in a radio interference countermeasure table, validity of the types of the plurality of pulse patterns for radio interference;
- determining whether or not there is a radio interference based on a radio signal received via an antenna;
- when determining that there is the radio interference, selecting a predetermined pulse pattern from the plurality of pulse patterns stored in the pulse pattern table and the radio interference countermeasure table based on an avoiding function of a wireless communication device having the avoiding function of the radio interference; and
- transmitting from the antenna the radio signal matching the selected pulse pattern.

14. The method according to claim 13, further comprising setting the transmitted pulse pattern as a valid pulse pattern on the avoiding function of the radio interference when the determining whether or not there is the radio interference determines that there is not the radio interference after the transmission of the transmitting.

\* \* \* \* \*